Patented Sept. 30, 1924.

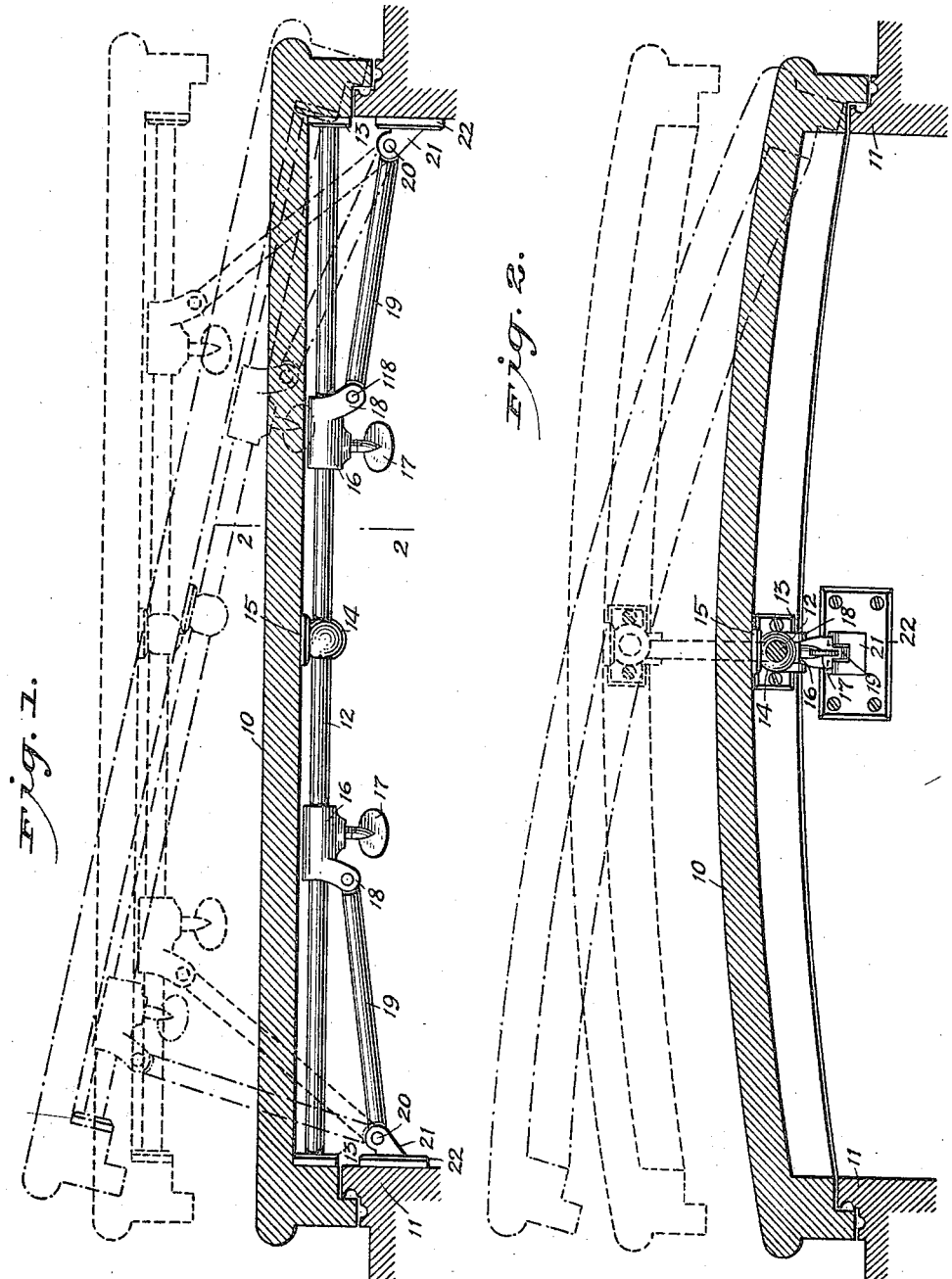

1,510,305

UNITED STATES PATENT OFFICE.

WILLIAM WALLACE CAMPBELL, OF YOKOHAMA, JAPAN.

HATCH-COVER FITTING.

Application filed March 6, 1923. Serial No. 623,277.

*To all whom it may concern:*

Be it known that I, WILLIAM WALLACE CAMPBELL, a subject of the King of Great Britain, and residing in Yokohama, Japan, have invented a new and Improved Hatch-Cover Fitting, of which the following is a description.

My invention although adapted for use on hatches, scuttles, and the like, is more particularly intended for use in connection with hatch covers of marine vessels.

The general object of my invention is to provide a fitting for securing the cover at the hatch opening and so supporting the cover that it may be opened to various positions including a parallel opening movement or opened in a tilted position at either of the four sides of the hatchway.

The nature of the invention, its distinguishing features and advantages will clearly appear as the description proceeds.

Reference is to be had to the accompanying drawings forming a part of this specification, it being understood that the drawings are merely illustrative of one example of the invention.

Figure 1 is a vertical section of a hatchway and its cover equipped with my improved fitting shown in side elevation;

Figure 2 is a vertical section at right angles to Figure 1 as indicated by the line 2—2, Figure 1.

In the illustrated example the numeral 10 indicates a hatch cover and 11 the combing about the hatchway. In accordance with my invention I provide on cover 10 at the under side a bar 12 extending from one side of the cover to the other and supported at its ends in bracket plates 13 and at its center by a depending bracket knob 14 on a base 15 secured to the under side of the cover at the approximate center, said rod 12 passing through said knob 14 and rigid therewith.

On the bar 12 at each side of the center are sleeves 16 provided with set screws 17 preferably thumb screws to fasten the sleeves against sliding movement on the bar 12 or to permit such sliding movement upon the loosening of said screws 17. To each sleeve 16 is pivotally secured one end of a rod 19, said sleeve being provided in the preferred form with bracket arms 18 with which the pivotal connection of said rod 19 is effected as at 118. The opposite, outer, end of each rod 19 has pivotal connection with the fixed structure of the hatchway, the connection being preferably as at 20 with bracket arms or legs 21 on bracket plates 22 secured by screws or equivalent means to opposite sides of the hatchway adjacent the combing.

With the above described fitting if the screws 17 be loosened and both sleeves 16 thereby free to move, the cover 10 may be raised by a parallel movement as indicated by the broken lines or dash lines in Figures 1 and 2. Or, the hatch cover may be tilted to one side or the other one of the tilted positions being indicated by dot-and-dash lines in Figure 1. In the tilting referred to the rods 19 have pivotal movement at both ends, that is to say, with the pivots 20 as one center of movement and the pivotal connection with the arms 18 as the other center of movement as will be clear from the dot-and-dash lines in Figure 1. Again, instead of tilting to positions by movements about the pivots 20, and 118, the hatch cover may be raised and then rocked in the sleeves 16 so that the cover will swing or tilt in either of opposite directions at right angles to the tilting involving the pivots 20 and 118, one of said tilted positions by turning movement in the sleeves 16 being indicated by dot-and-dash lines in Figure 2.

Thus, it will be seen that five different positions of the hatch cover are possible, to wit; the parallel movement or a movement tilted to either of the four sides of the hatchway. The set screws 17 serve to secure the hatch cover in any one of its adjusted positions.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:—

1. A hatch cover fitting comprising an elongated element, a pair of elements slidable on the said elongated element, means to secure said first mentioned element at the ends thereof to a hatch cover and means to separately and pivotally secure the slidable elements to the fixed structure of a hatch at opposite sides thereof.

2. A hatch cover fitting comprising an elongated element, elements slidable on the said elongated element, said elongated element being capable of rocking movement about its own axis in the second mentioned elements, and means to secure said first and second mentioned elements respectively to a hatch cover and to the fixed structure of a hatch.

3. A hatch cover fitting comprising an elongated element, elements slidable on the said elongated element, the first-mentioned element being turnable about its own axis in said second mentioned elements and means to secure said first and second mentioned elements respectively to a hatch cover and to the fixed structure of a hatch; together with optionally operable means to prevent sliding of the second mentioned elements and to hold the same in fixed relation to the elongated element.

4. A hatch cover fitting comprising an elongated bar, means to secure said bar at its ends to opposite sides of a hatch cover, separate slidable elements on said bar, separate rods pivotally connected at one end with said slidable elements, and means pivotally connected with the opposite end of each of said rods and adapted to be secured to the fixed structure of a hatch at opposite sides of the cover.

5. The combination with a hatch and a hatch cover, of an elongated bar on said cover, and means connected with the fixed structure of the hatch and with said bar, said means movable to permit rocking of the cover in opposite directions about the axis of said bar.

6. The combination with a hatch and a hatch cover, of an elongated bar on said cover, and means connected with the fixed structure of the hatch and with said bar, said means movable to permit rocking of the cover in opposite directions about the axis of said bar or permitting the tilting of said cover and bar.

7. The combination with a hatch and a hatch cover, of an elongated bar on said cover appproximately at the medial line thereof and extending between opposite sides of the cover, and means connected with the fixed structure of the hatch and with said bar, said means movable to permit rocking of the cover in opposite directions about the axis of said bar.

8. A hatch cover fitting comprising an elongated bar, means to secure the same to opposite sides of a hatch cover at approximately the medial line of the cover, and means securable to the fixed structure of a hatch and connected with said bar by means permitting a rocking of said bar and its securing means about the axis of the bar and permitting an endwise tilting of the bar.

WILLIAM WALLACE CAMPBELL.